(12) United States Patent
Yao et al.

(10) Patent No.: US 11,893,000 B2
(45) Date of Patent: Feb. 6, 2024

(54) DATA PROCESSING METHODS, APPARATUSES AND DEVICES

(71) Applicant: ZHEJIANG KOUBEI NETWORK TECHNOLOGY CO., LTD., Hangzhou (CN)

(72) Inventors: Yu Yao, Zhejiang (CN); Dafeng Wang, Zhejiang (CN)

(73) Assignee: ZHEJIANG KOUBEI NETWORK TECHNOLOGY CO., LTD., Zhejiang (CN)

( * ) Notice: Subject to any disclaimer, the term of this patent is extended or adjusted under 35 U.S.C. 154(b) by 160 days.

(21) Appl. No.: 17/417,541

(22) PCT Filed: Dec. 26, 2019

(86) PCT No.: PCT/CN2019/128839
§ 371 (c)(1),
(2) Date: Jun. 23, 2021

(87) PCT Pub. No.: WO2020/135624
PCT Pub. Date: Jul. 2, 2020

(65) Prior Publication Data
US 2022/0114158 A1    Apr. 14, 2022

(30) Foreign Application Priority Data
Dec. 29, 2018  (CN) .......................... 201811645148.5

(51) Int. Cl.
*G06F 16/23*     (2019.01)
*G06F 16/22*     (2019.01)
*G06Q 10/067*    (2023.01)

(52) U.S. Cl.
CPC ...... *G06F 16/2343* (2019.01); *G06F 16/2282* (2019.01); *G06Q 10/067* (2013.01)

(58) Field of Classification Search
CPC .................... G06F 16/2282; G06F 16/2343
(Continued)

(56) References Cited

U.S. PATENT DOCUMENTS 10,193,775 B2   1/2019  Fletcher et al.
2009/0210264 A1 8/2009  Anderson et al.
(Continued)

FOREIGN PATENT DOCUMENTS

| CN | 207529523 U | 6/2018 |
| CN | 108665342 A | 10/2018 |
| CN | 109739890 A | 5/2019 |

OTHER PUBLICATIONS

State Intellectual Property Office of the People's Republic of China, Office Action and Search Report Issued in Application No. 2018116451485, dated Jan. 21, 2020, 22 pages. (Submitted with Machine/Partial Translation).
(Continued)

*Primary Examiner* — Hung T Vy
(74) *Attorney, Agent, or Firm* — Getech Law LLC; Jun Ye

(57) ABSTRACT

This specification provides data processing methods, apparatuses and devices. In embodiments of the specification, table data includes a state identifier for indicating whether a target table is in a use state or an idle state. Therefore, after an occupying-table request is received, the table data can be obtained, and the state of the target table can be determined from the state identifier in the table data. If the target table is in the idle state, the table data is locked; after the state identifier is updated to the use state, the table data is released; and occupying-table data of the target table is generated to respond to the occupying-table request.

17 Claims, 4 Drawing Sheets

```
                                                    ┌─ 202
┌──────────────────────────────────────────────────────────────┐
│ After obtaining an occupying-table request for a target table,│
│ obtain table data of the target table, where the table data   │
│ includes a state identifier                                   │
└──────────────────────────────────────────────────────────────┘
         ┌──────────────────┴──────────────────┐
    ┌─ 204                                              ┌─ 206
┌──────────────────────────────────┐  ┌──────────────────────────────────┐
│ If the state identifier indicates│  │ If the state identifier indicates│
│ that the target table is in the  │  │ that the target table is in the  │
│ idle state, lock the table data  │  │ use state, obtain the current    │
│ based on the occupying-table     │  │ occupying-table data of the      │
│ request; release, after the state│  │ target table to respond to the   │
│ identifier is updated to the use │  │ occupying-table request          │
│ state, the table data; and       │  │                                  │
│ generate current occupying-table │  │                                  │
│ data of the target table         │  │                                  │
└──────────────────────────────────┘  └──────────────────────────────────┘
```

(58) Field of Classification Search
USPC .......................................................... 707/704
See application file for complete search history.

(56) References Cited

U.S. PATENT DOCUMENTS

2011/0161540 A1* 6/2011 Chang ..................... G06F 9/526
710/200
2013/0263148 A1* 10/2013 Brueggen ............. G06F 9/5016
718/104
2017/0322993 A1* 11/2017 Brodt .................... G06F 16/252

OTHER PUBLICATIONS

State Intellectual Property Office of the People's Republic of China, Office Action and Search Report Issued in Application No. 2018116451485, dated Apr. 7, 2020, 20 pages. (Submitted with Machine/Partial Translation).
State Intellectual Property Office of the People's Republic of China, Office Action and Search Report Issued in Application No. 2018116451485, dated Jun. 28, 2020, 21 pages. (Submitted with Machine/Partial Translation).
State Intellectual Property Office of the People's Republic of China, Rejection Office Action Issued in Application No. 2018116451485, dated Oct. 10, 2020, 32 pages. (Submitted with Machine/Partial Translation).
ISA State Intellectual Property Office of the People's Republic of China, International Search Report Issued in Application No. PCT/CN2019/128839, dated Mar. 27, 2020, WIPO, 4 pages.
Xiangyu Zhang,"Design of Wireless Ordering System Based on Android",China Master's Theses Full-text Database, Jun. 15, 2018, 56 pages.
Lin Zhang,"Design and Implementation of Wireless Ordering System Based on Android",China Master's Theses Full-text Database, Aug. 15, 2014, 17 pages.
Sha Li, "Design and Implementation of Self-Service Ordering System Based on Wireless Network", China Master's Theses Full-text Database, Mar. 15, 2013, 91 pages.
Jie Li, "The Development and Design of Wireless-Ordering System Software Based on Android Platform", China Master's Theses Full-text Database, May 15, 2016, 82 pages.
Dan Li, "Design and Implementation of Wireless Ordering System Based on Android", China Master's Theses Full-text Database, Apr. 1, 2012, 69 pages.
Dealing with Concurrency Issues, Mar. 3, 2017, 10 pages. (Submitted with Machine/Partial Translation).
Shared Locks and Exclusive Locks, Sep. 30, 2017, 5 pages. (Submitted with Machine/Partial Translation).

* cited by examiner

DATA PROCESSING METHODS, APPARATUSES AND DEVICES

CROSS REFERENCE TO RELATED APPLICATIONS

The present application is a U.S. national phase application of International Application No. PCT/CN2019/128839, filed on Dec. 26, 2019, which claims priority to Chinese patent application No. 201811645148.5 filed on Dec. 29, 2018, the entire contents of which are incorporated herein by reference.

TECHNICAL FIELD

The present specification relates to the field of Internet technology, and in particular, to data processing methods, apparatuses and devices.

BACKGROUND

With the development of Internet technology, services provided by various industries for users are becoming more and more intelligent, for example, traditional manual food ordering manner in restaurant service industry is gradually being replaced by a smart food ordering system. In the smart food ordering scenario, diners can use a customer client device to initiate an occupying-table request for a table, so that a server can process subsequent ordering flows corresponding to the table. Alternatively, a waiter of a restaurant can use a merchant client device to initiate an occupying-table request for a table. Therefore, there is a possibility of multiple people initiating occupying-table requests for the same table at the same time. Based on this, it is necessary to provide a better data processing method to prevent errors that may occur in a case of concurrent requests.

SUMMARY

In order to overcome the problems existing in the related art, the present specification provides data processing methods, apparatuses and devices.

According to a first aspect of embodiments of the present specification, there is provided a data processing method, including:

after obtaining an occupying-table request for a target table, obtaining table data of the target table, where the table data includes a state identifier for indicating whether the target table is in a use state or an idle state; if the state identifier indicates that the target table is in the idle state, locking the table data, after the state identifier is updated to the use state, releasing the table data, and generating current occupying-table data of the target table to respond to the occupying-table request; if the state identifier indicates that the target table is in the use state, obtaining the current occupying-table data of the target table to respond to the occupying-table request.

According to a second aspect of the embodiments of the present specification, there is provided a data processing method, including: after obtaining an occupying request for a service resource, obtaining resource data of the service resource, where the resource data includes a state identifier for indicating whether the service resource is in a use state or an idle state; if the state identifier indicates that the service resource is in the idle state, locking the resource data, after the state identifier is updated to the use state, releasing the resource data, and generating current occupying data of the service resource to respond to the occupying request; if the state identifier indicates that the service resource is in the use state, obtaining the current occupying data of the service resource to respond to the occupying request.

According to a third aspect of the embodiments of the present specification, there is provided a data processing method, including: determining a target table to be occupied, and initiating an occupying-table request for the target table to a server; obtaining current occupying-table data of the target table returned from the server, where the current occupying-table data is generated by the server by: obtaining table data of the target table, locking the table data of the target table, and after a state identifier of the table data is updated from an idle state to a use state, releasing the table data.

According to a fourth aspect of the embodiments of the present specification, there is provided a data processing method, including: determining a service resource to be occupied, and initiating an occupying request for the service resource to a server; obtaining current occupying data of the service resource returned from the server, where the current occupying data is generated by the server by: obtaining resource data of the service resource, locking the resource data of the service resource, and after a state identifier of the resource data is updated from an idle state to a use state, releasing the resource data.

According to a fifth aspect of the embodiments of the present specification, there is provided a data processing apparatus, including: an occupying-table request obtaining module configured to, after obtaining an occupying-table request for a target table, obtain table data of the target table, where the table data includes a state identifier for indicating whether the target table is in a use state or an idle state; an occupying-table data generating module configured to, if the state identifier indicates that the target table is in the idle state, lock the table data, after the state identifier is updated to the use state, release the table data, and generate current occupying-table data of the target table to respond to the occupying-table request; an occupying-table data obtaining module configured to, if the state identifier indicates that the target table is in the use state, obtain the current occupying-table data of the target table to respond to the occupying-table request.

According to a sixth aspect of the embodiments of the present specification, there is provided a data processing apparatus, including: an occupying request obtaining module configured to, after obtaining an occupying request for a service resource, obtain resource data of the service resource, where the resource data includes a state identifier for indicating whether the service resource is in a use state or an idle state; an occupying data generating module configured to, if the state identifier indicates that the service resource is in the idle state, lock the resource data, after the state identifier is updated to the use state, release the resource data, and generate current occupying data of the service resource to respond to the occupying request; an occupying data obtaining module configured to, if the state identifier indicates that the service resource is in the use state, obtain the current occupying data of the service resource to respond to the occupying request.

According to a seventh aspect of the embodiments of the present specification, there is provided a computer device, including: one or more memories, one or more processors and a computer program stored on the one or more memories and running on the one or more processors, where the one or more processors execute the computer program to perform the data processing methods as described above.

It should be understood that the above general description and the following detailed description are only exemplary and explanatory and are not restrictive of the present specification.

BRIEF DESCRIPTION OF THE DRAWINGS

The accompanying drawings, which are incorporated in and constitute a part of this specification, illustrate embodiments consistent with the present specification and, together with the specification, serve to explain the principles of the specification.

DETAILED DESCRIPTION OF THE EMBODIMENTS

Figure 1:
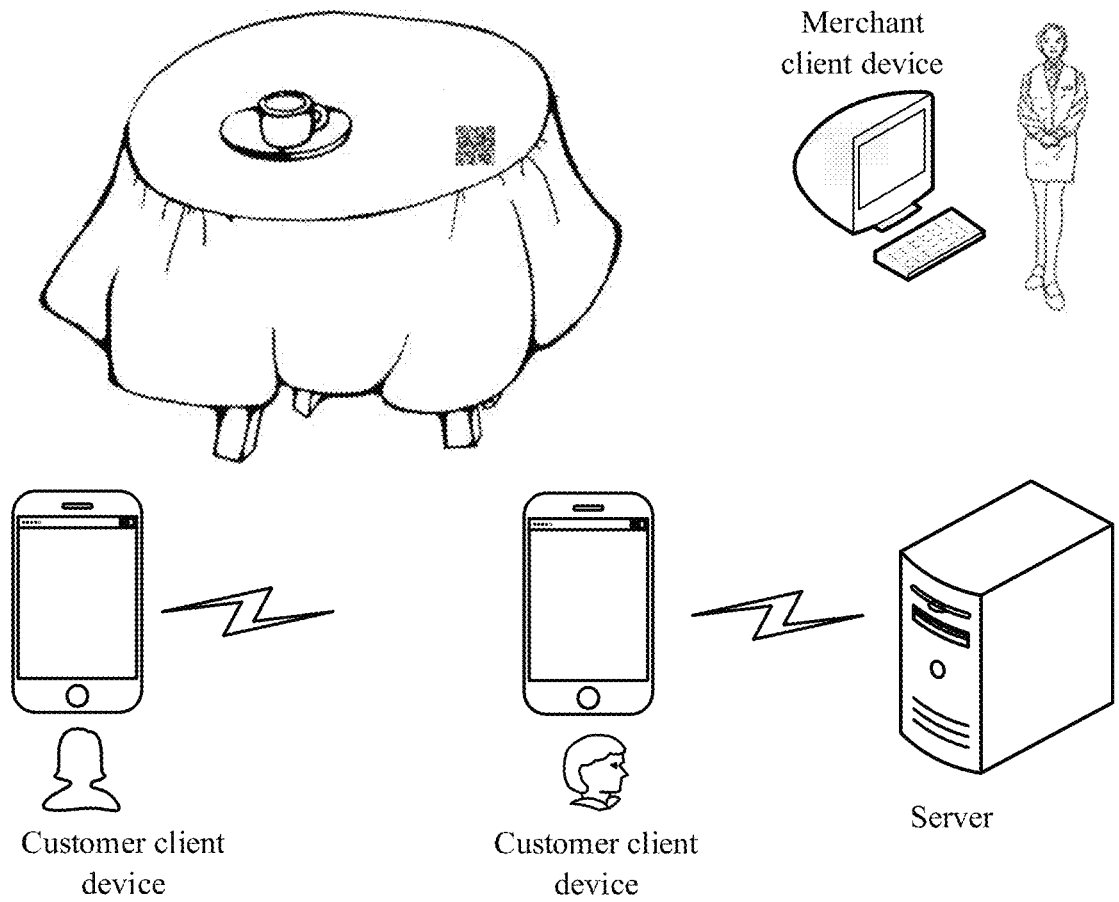
FIG. 1 is a schematic diagram illustrating a restaurant scenario according to an example embodiment of the present specification.

Embodiments will be described in detail herein, with the illustrations thereof represented in the drawings. When the following descriptions involve the drawings, like numerals in different drawings refer to like or similar elements unless otherwise indicated. The embodiments described in the following embodiments do not represent all embodiments consistent with the present specification. Rather, they are merely examples of apparatuses and methods consistent with some aspects of the present specification as detailed in the appended claims.

The terms used in the present specification are for the purpose of describing particular embodiments only, and are not intended to limit the present specification. Terms determined by "a", "the" and "said" in their singular forms in the present specification and the appended claims are also intended to include plurality, unless clearly indicated otherwise in the context. It should also be understood that the term "and/or" as used herein refers to and includes any and all possible combinations of one or more of the associated listed items.

It should be understood that, although terms "first," "second," "third," and the like can be used in the present specification to describe various information, such information should not be limited to these terms. These terms are only used to distinguish one category of information from another. For example, without departing from the scope of the present specification, first information can be referred as second information; and similarly, second information can also be referred as first information. Depending on the context, the word "if" as used herein can be interpreted as "when" or "upon" or "in response to determining".

With the development of Internet technology, services provided by various industries for users are becoming smarter. In many business scenarios, services provided by a service provider to a user involve occupying of service resources. Therefore, the occupying process of service resources needs to be executed in a service process. That is, how to handle the occupying process will affect the normal execution of the service process. For example, service industry in life involves a variety of applications of such scenarios.

A secret room escape scenario is taken as an example, any user in a team can use a client device to initiate an occupying request for a secret room, so that a server can process a subsequent service process of the secret room. Or, a waiter of a business can use a client device to initiate an occupying request for the secret room. Thus, there may appear a case where multiple people can initiate occupying requests for a same secret room at the same time.

A KTV scenario is taken as an example, any user in a team can use a client device to initiate an occupying request for a private room, so that a server can process a subsequent service process of the private room. Or, a waiter of a business can use a client device to initiate an occupying request for the private room. Thus, there may appear a case where multiple people can initiate occupying requests for a same private room at the same time.

In a smart food ordering scenario, diners can use a client device to initiate an occupying-table request for a table, so that a server can handle a subsequent ordering flow of the table. Or, a waiter of a restaurant can use a client device to initiate the occupying-table request for the table. Therefore, there may appear a case where multiple people can initiate occupying-table requests for a same table at the same time.

In the above various scenarios, a service provider provides a service resource for users, and the occupying process of the service resource in a service process needs to be executed. Since there may appear a case where multiple parties can initiate occupying requests for a same service resource at the same time, data processing methods provided in embodiments of the present specification can prevent errors that may occur in the case of concurrent requests.

Taking a restaurant scenario as an example to illustrate the data processing methods provided in this specification, as shown in FIG. 1, which is a schematic diagram illustrating a restaurant scenario according to an example embodiment of the present specification. FIG. 1 involves a server configured by a service provider, a client device with a food ordering function, etc. provided by the service provider to a user, (that is, a client device provided to diners, also referred to as a customer client device), and a client device with a smart cash register function, etc. provided by the service provider to a business, (that is, a client device provided to store staff, also referred to as a merchant client device).

As an example, a merchant can register on a merchant client device and submit restaurant-related information such as menu information, discount information or table information. The table information includes a number of tables available for users provided by the merchant and a table identifier of each table.

The service provider provides a restaurant service platform, and the merchant can use the restaurant service platform to provide restaurant services to users. As an example, the service provider provides the users with customer client devices, through which multiple registered merchants can be displayed, and the users can use a food ordering function provided by the customer client device to trigger a food ordering flow. As an example, a QR code can be provided on a table, and the QR code carries a merchant identifier and a table identifier, the users can scan the QR code with the customer client device, after that, the customer client device can identify the merchant identifier and the table identifier involved in the QR code, thereby starting subsequent food ordering flow, for example, the server generates an order corresponding to the table. In other examples, the merchant can use a merchant client device to generate an order corresponding to the table for diners.

In some scenarios, there can appear a case of concurrency, and there can be problems in the process of generating orders. For example, when a team comes to a restaurant for dinning, many of team members initiate occupying-table requests at the same time, or, a team member A uses a customer client device to scan a QR code on a table to order dishes. At this time, the customer client device sends an occupying-table request to a server, at the same time, a team member B requests a waiter to place an order at a service desk, and the waiter uses a merchant client device to initiate an occupying-table request. In the ordering scenario, the occupying-table request refers to a request for occupying a table.

Figure 2:
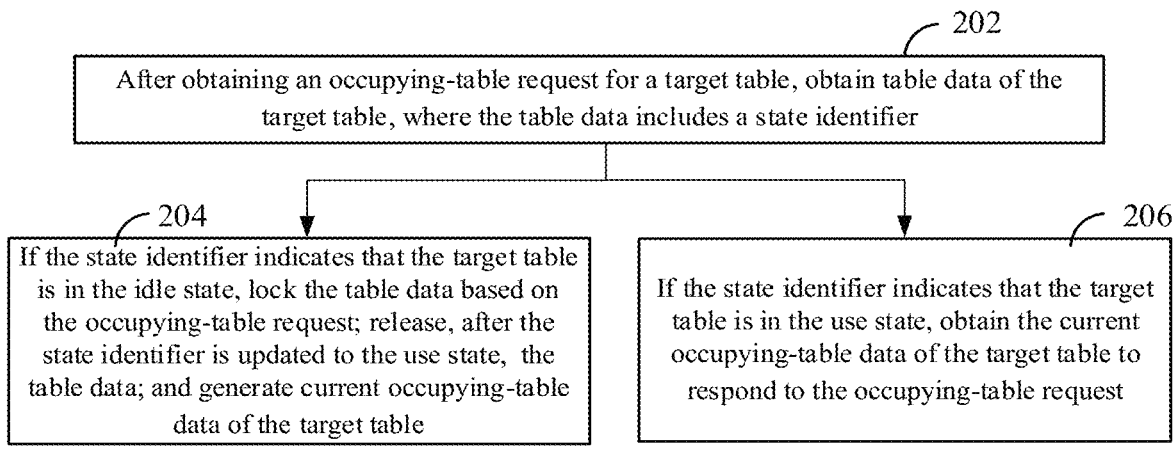
FIG. 2 is a flowchart illustrating a data processing method according to an example embodiment of the present specification.

Based on this, in order to prevent data processing errors, as shown in FIG. 2, which is a flowchart illustrating a data processing method according to an example embodiment of the present specification, the data processing method can be applied to a server, and includes the following steps 202-206.

At step 202, after an occupying-table request for a target table is obtained, table data of the target table is obtained; where the table data includes a state identifier for indicating whether the target table is in a use state or an idle state.

At step 204, if the state identifier indicates that the target table is in the idle state, the table data is locked; after the state identifier is updated to the use state, the table data is released; and current occupying-table data of the target table is generated to respond to the occupying-table request.

At step 206, if the state identifier indicates that the target table is in the use state, the current occupying-table data of the target table is obtained to respond to the occupying-table request.

The table data can further include table attribute information such as a table identifier and a restaurant identifier of a restaurant to which the table belongs. In embodiments of the present specification, the table data includes a state identifier, where the state identifier indicates that the target table is in the use state or the idle state, when needed, by reading the state identifier in the table data, current usage of the table can be determined. The use state can be written in the state identifier when the table is needed to be occupied, and updated to the idle state after an order corresponding to the table is completed. The specific processing will be described in detail later.

In embodiments of the present specification, unlike table data, occupying-table data refers to data created by a server for a table after occupied by diners. If an initiator of an occupying-table request receives occupying-table data from the server, it indicates that corresponding table is currently occupied by diners. The occupying-table data can include a unique identifier of its own data (also referred to as data identifier (ID) of the occupying-table data), and can also include other occupying-table-related information such as the table identifier, the restaurant identifier and occupying-table time. It can be understood that one table can correspond to one piece of table data, and the one table can correspond to a plurality of pieces of occupying-table data, including current occupying-table data and historical occupying-table data. The current occupying-table data refers to occupying-table data during a period of a table being currently occupied. When an order corresponding to the table is completed or the table is unoccupied, the state identifier of the table changes from the use state to the idle state. Accordingly, a life cycle of current occupying-table data is completed, and the current occupying-table data is converted to the historical occupying-table data.

In this embodiment, the occupying-table request for the target table can be initiated by multiple parties, for example, a waiter of a business using a merchant client device or diners using customer client devices. In actual applications, a single occupying-table request can occur, or concurrent requests can occur.

Specifically, the occupying-table request can be implemented in many ways. An optional implementation way is to provide a QR code corresponding to a table (the QR code image is pasted on the table). A merchant client device and a customer client device can parse out the restaurant identifier and the table identifier of the table carried in the QR code by scanning the QR code, so as to determine the table for which the waiter or the user has initiated an occupying-table request. In other examples, both the merchant client device and the customer client device provide a table number input function, the user can input a table number on a restaurant page of the customer client device, and the customer client device initiates an occupying-table request after obtaining the table number input by the user; or, the waiter of the business inputs the table number on a restaurant page of the merchant client device, and the merchant client device initiates an occupying-table request after obtaining the table number input by the waiter.

Taking a situation that a single occupying-table request occurs as an example, it is assumed that current target table is in the idle state. After a diner uses a customer client device to initiate an occupying-table request, the customer client device sends the occupying-table request to a server, or after a waiter of a business uses a merchant client device to initiate the occupying-table request, the merchant client device sends an occupying-table request to the server. The server can apply the data processing method in this embodiment, and after the occupying-table request is received, can obtain table data of the target table. Optionally, the table data of the target table can be queried from a database of the server with a unique identifier of the target table. The unique identifier can be flexibly configured as needed, for example, it can be composed of a restaurant identifier of a restaurant to which the table belongs and a table identifier.

After querying the table data of the target table, current state of the target table can be determined from the state identifier. If the state identifier indicates that the target table is in the idle state, a process of occupying the target table can be executed. As an example, when it is determined that the target table is in the idle state, the table data can be locked, and after the state identifier is updated to the use state, the table data is released, and the current occupying-table data of the target table is generated to respond to the occupying-table request. In this embodiment, since it takes a certain amount of processing time to generate the current occupying-table data and update the state identifier, by locking the table data, the table data can be operated only through the processing of one occupying-table request, which prevents the processing of other occupying-table requests from operating the table data at the same time.

Optionally, the locking process can be realized by using a locking function provided by a database management system. For example, the database management system provides a variety types of lock such as an optimistic lock, a pessimistic lock, an exclusive lock and a shared lock. In this embodiment, the table data is stored in a database of the server. Since only one piece of table data needs to be locked, and other client devices need to be prevented from operating on the table data, an exclusive row level lock can be used to lock the table data. Optionally, an exclusive row level lock instruction for the table data can be initiated to the database. "Exclusive" means that only one client device is allowed to operate the table data, and "row level" means that only one piece of data in a list is operated, without locking the entire list. In this scenario, the entire list can refer to a list composed of table data corresponding to each table of multiple businesses (or restaurants), and one piece of data in the list refers to one piece of table data. After the table data is locked to ensure that no other client devices can operate the table data, the state identifier of the table data can be updated. Optionally, an update instruction for the state identifier of the table data can be initiated to the database, or an exclusive row level lock instruction can carry update information for the state identifier to update the state identifier to the use state, after that, the table data is released. As an example, the following exclusive row level lock instruction can be used: Select * from tab 1 for update. Data in a row of list tab 1 can be found from a Structured Query Languages (SQL) statement identifier and locked, and the data in the row of list tab 1 is automatically released after modified. The list tab 1 can refer to the entire list mentioned above.

Taking a situation that the server receives multiple to-be-processed occupying-table requests or receives the multiple to-be-processed occupying-table requests at the same time as an example, the concurrency problem can be solved through the above method. As an example, it is assumed that there are two occupying-table requests. The server can obtain the occupying-table requests in chronological order. First, an occupying-table request A is obtained, when processing the occupying-table request A, step 204 is performed, the table data is locked, and after the state identifier of the table data is updated to the use state, the table data is released, and current occupying-table data is generated for the occupying-table request A. When the table data is locked, the state identifier of the table data cannot be modified for other occupying-table requests, which can prevent processing errors in a case where there are multiple occupying-table requests. After the occupying-table request A is processed, that is, after the current occupying-table data is generated, an occupying-table request B can be processed. When processing the occupying-table request B, the state identifier in the table data indicates that the target table is in the use state, therefore, the table will not be occupied for the occupying-table request B, and the current occupying-table data is returned for the occupying-table request B. Optionally, if a multithread processing method is adopted, since the table data can be locked only by one task, with the method in this embodiment, ensuring that the table data is locked and processed only for one of occupying-table requests.

As can be known from the above embodiments, table data includes a state identifier for indicating whether a target table is in a use state or an idle state. Therefore, after an occupying-table request is received, a state of the target table can be determined from the state identifier. If the target table is in the idle state, the table data is locked, and after the state identifier is updated to the use state, the table data is released, and current occupying-table data of the target table is generated to respond to the occupying-table request. Because the table data is locked, in a case of concurrent occupying-table requests, the table data is obtained and the current occupying-table data is generated only for one occupying-table request, while the table data cannot be obtained for other occupying-table requests. In addition, after the state identifier of the table is updated to the use state, the table data is unlocked, and when processing other concurrent occupying-table requests, the table is found to be in the use state, which can prevent the concurrency of multiple occupying-table requests causing the generation of multiple orders.

After the target table is occupied, diners may or not have ordered. In some examples, if the state identifier indicates that the target table is in the use state, and the user has ordered, the current occupying-table data received by the customer client device or the merchant client device can also include order data corresponding to the target table. In other examples, the current occupying-table data can be distinguished from the order data generated on the target table. Specifically, if the state identifier indicates that the target table is in the use state and the user has ordered, the server can return the current occupying-table data and the order data to the customer client device or the merchant client device. Optionally, the occupying-table request is initiated by the customer client device or the merchant client device, and responding to the occupying-table request can include: sending the current occupying-table data to the customer client device or the merchant client device for the customer client device or the merchant client device to initiate an ordering request based on the current occupying-table data. After the ordering request is received, the server can generate local order data and send it to the customer client device and/or the merchant client device. After the order is completed, it means that the table can be unoccupied, so that the state identifier of the table data can be updated from the use state to the idle state.

Next, details are further described in the following embodiments.

Figure 3A:
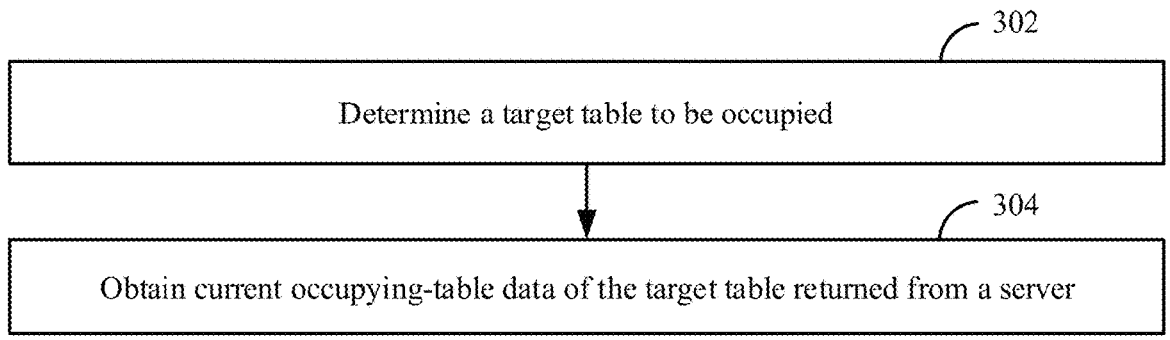
FIG. 3A is a flowchart illustrating a data processing method according to an example embodiment of the present specification.

FIG. 3A is a flowchart illustrating a data processing method according to an example embodiment of the present specification. The flow of the data processing method can be applied to a customer client device. Specifically, the data processing method shown in FIG. 3A includes the following steps 302-304.

At step 302, a target table to be occupied is determined, and an occupying-table request for the target table is initiated to a server.

At step 304, the current occupying-table data of the target table returned from the server is obtained, where the current occupying-table data is generated by the server by: obtaining table data of the target table, locking the table data of the target table, and after a state identifier of the table data is updated from an idle state to a use state, releasing the table data.

Figure 3B:
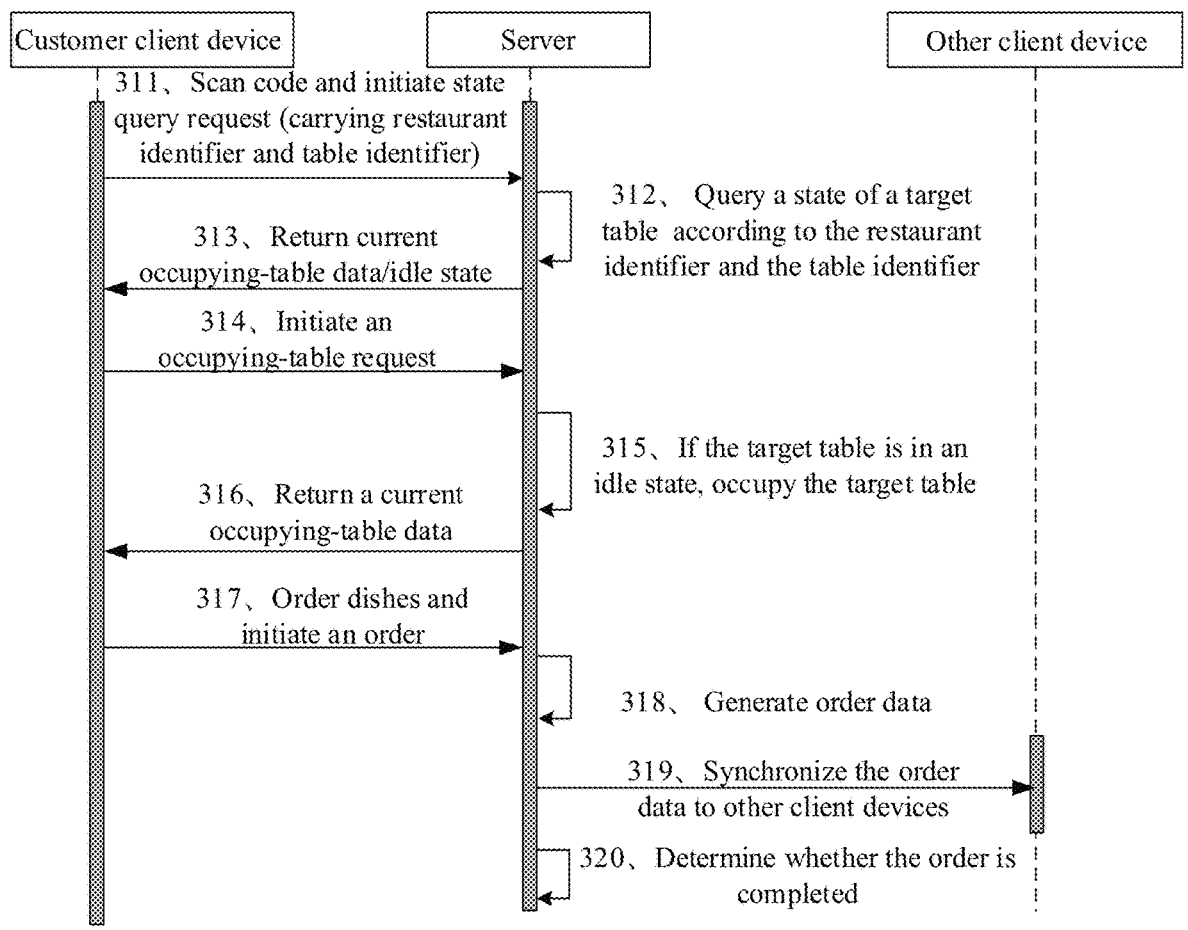
FIG. 3B is a flowchart illustrating a data processing method according to an example embodiment of the present specification.

With reference to FIG. 3B, a customer client device is held by a diner, and the diner can use a graphic code scanning function provided by the customer client device to scan a QR code on the table through the customer client device. The client device can invoke a camera module to obtain graphic code image data, and determine the target table to be occupied by identifying a table identifier carried by the graphic code image data. The specific steps can include 311-320.

At step 311, after scanning a QR code, a customer client device initiates, to a server, a table state query request carrying QR code information (including a restaurant identifier and the table identifier of the target table).

At step 312, after parsing the QR code information, the server obtains the restaurant identifier and the table identifier of the target table, and then queries the state of the target table based on the restaurant identifier and the table identifier.

At step 313, the server can obtain table data of the target table through the restaurant identifier and the table identifier, and determine whether the target table is currently in an idle state or a use state by reading the state identifier in the table data. If the target table is currently in the use state, it means that the target table has been occupied, and the server can obtain the current occupying-table data of the target table and return it to the customer client device. If the target table is currently in the idle state, the server can return the idle state to the customer client device.

At step 314, if the customer client device receives the current occupying-table data, it can be determined that the target table has been occupied. If the idle state is received, it can be determined that the target table has not been occupied, and the customer client device can initiate an occupying-table request to the server.

At step 315, the server generates current occupying-table data for the target table based on the occupying-table request. Optionally, the current occupying-table data corresponds to the target table, and data ID of occupying-table data included in the current occupying-table data can be generated based on the restaurant identifier and the table identifier of the target table. Since the state identifier indicates that the target table is in the idle state, the server can lock the table data, and after the state identifier is updated to the use state, release the table data, and generate the current occupying-table data of the target table to respond to the occupying-table request.

At step 316, the server returns the current occupying-table data to the customer client device.

At step 317, when the customer client device receives the current occupying-table data, the user can order dishes through the customer client device. The customer client device can provide an order initiating page, and obtain ordering information from information input by the user on the order initiating page, then initiate an ordering request carrying the ordering information to the server. After obtaining the ordering information, the customer client device can initiate, to the server, the ordering request based on the current occupying-table data. Optionally, the ordering request can include: the current occupying-table data, the ordering information and other related information. The customer client device at the steps 311-317 can also be referred to as a first client device.

At step 318, after the server receives the ordering request, order data can be generated.

At step 319, the server can synchronize the order data to other client devices (also referred to as a second client device) connected with the server such as a merchant client device or customer client devices of other users. Specifically, the second client device can scan the QR code on the table to initiate an occupying-table request carrying the QR code information (including the restaurant identifier and the table identifier of the target table) to the server. The server obtains the table data of the target table by parsing the QR code information, and determines that the target table is currently in the use state, which indicates that the target table has been occupied, by reading the state identifier in the table data. The server can return the current occupying-table data and the order data to the second client device. When the current occupying-table data and the order data are received, the second client device can initiate a second ordering request. The server can generate updated order data based on the second ordering request. Optionally, the server can also return the updated order data to the first client device, so that the first client device can obtain and display the updated order data. At the same time, since the first client device and the second client device are in a connected state with the server, in the subsequent ordering flow such as adding or reducing dishes, the server can continuously send order data to the first client device and the second client device to realize the synchronization of the order data to other client devices.

Optionally, other client devices can receive and display the order data sent by the server.

At step 320, the server can determine whether the order is completed according to a state of the order so as to determine whether the user is still in a dinning state. For example, if the order is in a paid state, it can be determined that the order is completed.

Figure 3C:
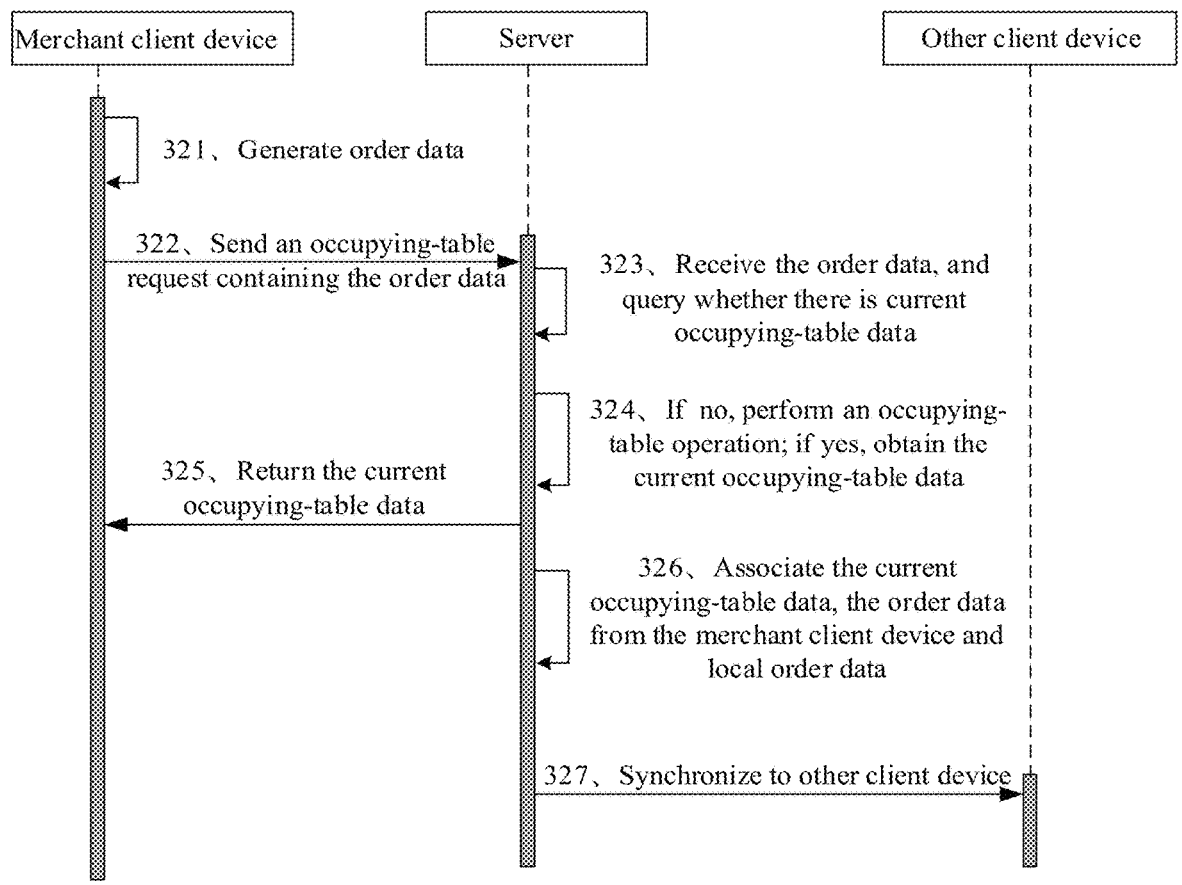
FIG. 3C is a flowchart illustrating a data processing method according to an example embodiment of the present specification.

In some examples, a processing flow of a merchant client device can be consistent with the processing flow of the customer client device described above. In other examples, the merchant client device and the customer client device can be products from different manufacturers, so that their processing flows can be inconsistent. At this time, the processing flow of the merchant client device can include steps 321-327 as shown in FIG. 3C.

At step 321, the merchant client device places an order for a target table, and generates order data from the merchant client device. For example, the merchant client device can provide an order initiating page, and obtain the order data from the merchant client device from information input by a waiter on the order initiating page. The order data from the merchant client device can include a restaurant identifier, a table identifier, ordering information, etc. corresponding to the target table.

At step 322, the merchant client device sends, to a server, an occupying-table request including the order data from the merchant client device.

At step 323, after the server receives the occupying-table request, whether the target table has current occupying-table data can be queried.

At step 324, if the target table has the current occupying-table data, the current occupying-table data can be obtained. If the current occupying-table data is not obtained, an occupying-table processing flow can be executed including: obtaining table data of the target table by the server, and determining whether the target table is currently in an idle state or a use state by reading a state identifier in the table data, if the target table is currently in the idle state, generating the current occupying-table data for the target table. Optionally, the current occupying-table data corresponds to the target table, and a data identifier (ID) of occupying-table data included in the current occupying-table data can be generated based on the restaurant identifier and the table identifier of the target table. Since the state identifier indicates that the target table is in the idle state, the table data is locked, after the state identifier is updated to the use state, the table data is released, and the current occupying-table data of the target table is generated to respond to the occupying-table request. If the merchant client device obtains the current occupying-table data, the server can also generate local order data based on the order data from the merchant client device, and associate the current occupying-table data, the order data from the merchant client device and the local order data.

At step 325, the server returns the current occupying-table data to the merchant client device.

At step 326, the current occupying-table data and the order data from the merchant client device are associated. If there is any more local order data, the three can be associated.

At step 327, the local order data is synchronized to the merchant client device and other client devices connected with the server. During the ordering on the target table, there may be other customer client devices or the merchant client device that will perform operations such as adding dishes. The specific operations can be as shown at step 319 in FIG. 3B, and will not be repeated here. Optionally, if order data from other client devices is received, order data from the associated merchant client device is updated. If order data from the merchant client device is received, the associated local order data is updated.

Assuming that there are multiple requests to invoke an occupying-table interface at the same time, the server can obtain occupying-table requests in chronological order. An occupying-table request A is obtained first, when processing the occupying-table request A, the table data is locked, after a state identifier of the table data is updated to the use state, the table data is released, and current occupying-table data is generated for the occupying-table request A. When the table data is locked, the state identifier of the table data cannot be modified for other occupying-table requests, which can prevent processing errors in a case where there are multiple occupying-table requests. After the occupying-table request A is processed, that is, after the current occupying-table data is generated, an occupying-table request B can be processed. When processing the occupying-table request B, the state identifier in the table data indicates that the target table is in a use state, so that the table will not be occupied for the occupying-table request B, and the current occupying-table data will be returned.

Figure 4:
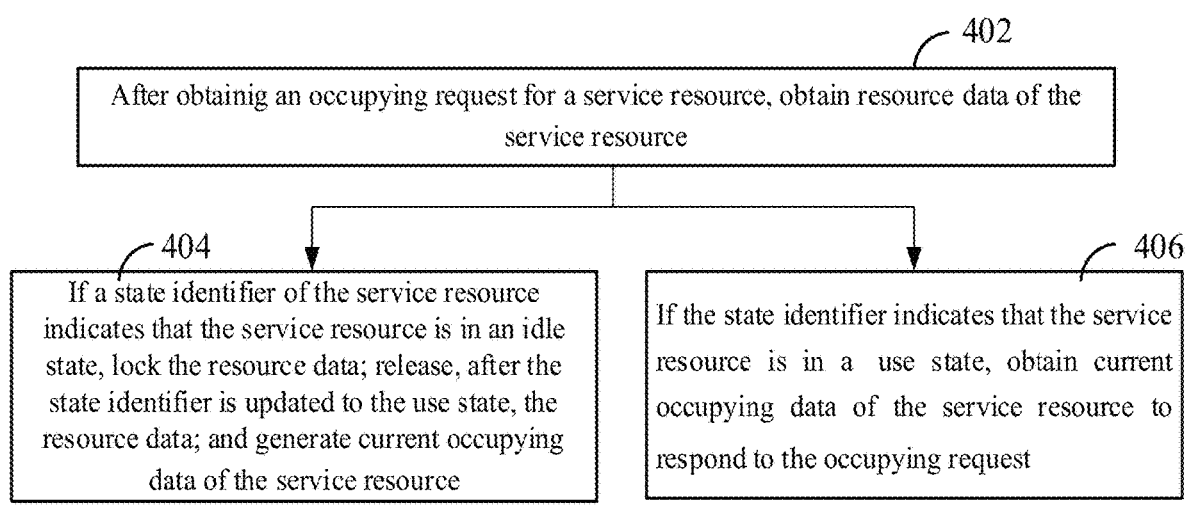
FIG. 4 is a flowchart illustrating a data processing method according to an example embodiment of the present specification.

The above embodiments taking the ordering scenario as an example illustrate the data processing method of this specification in detail, as mentioned above, life service industry often faces such problem, and computer field or the like can also be involved. Therefore, this specification also provides another data processing method according to an example embodiment, which can be applied to multiple types of scenarios. FIG. 4 is a flowchart illustrating another data processing method according to an example embodiment of the present specification. The data processing method can be applied to a server, and includes the following steps 402-406.

At step 402, after an occupying request for a service resource is obtained, resource data of the service resource is obtained, where the resource data includes a state identifier for indicating whether the service resource is in a use state or an idle state.

At step 404, if the state identifier indicates that the service resource is in the idle state, the resource data is locked; after the state identifier is updated to the use state, the resource data is released; and current occupying data of the service resource is generated to respond to the occupying request.

At step 406, if the state identifier indicates that the service resource is in the use state, the current occupying data of the service resource is obtained to respond to the occupying request.

The service resource in this embodiment refers to a resource available for a user and provided by a service provider. The service resource can represent different objects according to different actual application scenarios. The service source can include the aforementioned secret room, private room, or dining table, or be a service time range of service personnel such as the service time of fitness coaches from 9:00 to 10:00 on Jan. 1, 2019. In computer and other application scenarios, the service source can further be a software resource such as a processing thread or a bandwidth resource, or be a hardware resource such as a memory, a hard disk or a server.

The resource data can further include resource attribute information such as a resource identifier and a resource provider identifier. In embodiments of the present specification, the resource data includes a state identifier, which indicates that the service resource is in a use state or an idle state, when needed, by reading the state identifier in the resource data, current usage of the service resource can be determined. The use state can be written in the state identifier when the service resource is needed to be occupied, and updated to the idle state after an order corresponding to the service resource is completed.

In embodiments of the present specification, unlike the resource data, occupying data refers to data created by a server for a service resource after occupied by a user. If an initiator of the occupying request receives the occupying data from the server, it indicates that corresponding service resource is currently occupied by the user. The occupying data can include a unique identifier of its own data, and can also include other occupying related information such as a resource identifier, a resource provider identifier or occupying time. It can be understood that one service resource can correspond to one piece of resource data, and the one service resource can correspond to multiple pieces of occupying data, including current occupying data and historical occupying data. The current occupying data refers to occupying data during a period of the service resource being currently occupied. When an order corresponding to the service resource is completed or the service resource is unoccupied, the state identifier of the service resource is changed from the use state to the idle state. Accordingly, a life cycle of the current occupying data is completed, and the current occupying data is converted to the historical occupying data.

In this embodiment, the occupying request for the service resource can be initiated by multiple parties, for example, service personal of a business using a merchant client device or a user using a customer client device. In actual applications, a single occupying request can occur, or concurrent requests can occur. The server can apply the data processing method in this embodiment, and after the occupying request is received, obtain the resource data of the service resource. Optionally, the resource data of the service resource can be queried from a database with the unique identifier of the service resource. For example, the unique identifier can be composed of the resource identifier and the resource provider identifier, which is not limited here.

After querying the resource data of the service resource, the current state of the service resource can be determined from the state identifier. If the state identifier indicates that the service resource is in the idle state, a process of occupying the service resource can be executed. As an example, when it is determined that the service resource is in the idle state, the resource data can be locked, and after the state identifier is updated to the use state, the resource data can be released, and the current occupying data of the service resource is generated to respond to the occupying request. In this embodiment, since it takes a certain amount of processing time to generate the current occupying data and update the state identifier, by locking the resource data, the resource data can be operated only through the processing of one occupying request, which prevents the processing of other occupying requests from operating the resource data at the same time. Optionally, the resource data is stored in the database of the server, and locking the resource data includes: initiating an exclusive row level lock instruction for the resource data to the database to lock the resource data. Optionally, the exclusive row level lock instruction carries update information for the state identifier, so that the resource data is to be released after the state identifier is updated to the use state.

Taking a situation that a server receives multiple to-be-processed occupying requests, or receives the multiple to-be-processed occupying requests at the same time as an example, the concurrency problem can be solved through the above method. As an example, it is assumed that there are two occupying requests. The server can obtain the occupying requests in chronological order. First, an occupying request A is obtained, when processing the occupying request A, step 404 is performed, the resource data is locked, after the state identifier of the resource data is updated to the idle state, the resource data is released, and current occupying data is generated for the occupying request A. When the resource data is locked, the state identifier of the resource data cannot be modified for other occupying requests, which can prevent processing errors in a case where there are multiple occupying requests. After the occupying request A is processed, that is, after the current occupying data is generated, an occupying request B can be processed. When processing the occupying request B, the state identifier in the resource data indicates that the service resource is in the use state, so that the resource will not be occupied for the occupying request B, and the current occupying data is returned for the occupying request B. Optionally, if a multithread processing method is adopted, since the resource data can be locked only by one task, with the method in this embodiment, ensuring that the resource data is locked and processed only for one of occupying requests.

As can be known from the above embodiment, resource data includes a state identifier for indicating whether the service resource is in a use state or an idle state. Therefore, after an occupying request is received, a state of the service resource can be determined from the state identifier. If the service resource is in the idle state, the resource data is locked, and after the state identifier is updated to the use state, the service resource is unlocked and current occupying data of the service resource is generated to respond to the occupying request. Because the resource data is locked, in a case of concurrent occupying requests, the resource data is obtained and the current occupying data is generated only for one occupying request, while the resource data cannot be obtained for other occupying requests. In addition, after the resource identifier is updated to the use state, the resource data is unlocked, and when processing other concurrent occupying requests, the service resource is found to be in the use state, which can prevent the concurrency of multiple occupying requests causing the generation of multiple orders.

Optionally, the occupying request is initiated by a customer client device or a merchant client device, and responding to the occupying request includes: sending the current occupying data to the customer client device or the merchant client device for the customer client device or the merchant client device to initiate an ordering request based on the current occupying data.

Optionally, the data processing method further includes: after the ordering request is received, generating and sending local order data to the customer client device or the merchant client device.

Optionally, the occupying request is initiated by the merchant client device after first order data for the service resource is generated, and the occupying request carries the first order data from the merchant client device.

Responding to the occupying request includes: generating local order data based on the first order data from the merchant client device; and associating the current occupying data, the first order data from the merchant client device, and the local order data.

Optionally, the data processing method further includes: if order data from the customer client device is received, updating the first order data from the associated merchant client device and the associated local order data; if second order data from the merchant client device is received, updating the associated local order data.

Optionally, the method further includes:
after the order is completed, updating the state identifier from the use state to the idle state.

Optionally, the method further includes:
synchronizing the local order data to other client devices that are in a connected state and have initiated an occupying request for the service resource.

Corresponding to the method shown in FIG. 4, this embodiment also provides a data processing method can be applied to a client device, the method includes:
determining a service resource to be occupied, and initiating an occupying request for the service resource to a server;
obtaining current occupying data of the service resource returned from the server, where the current occupying data is generated by the server by: obtaining resource data of the service resource, locking the resource data of the service resource, and after a state identifier of the resource data is updated from an idle state to a use state, releasing the resource data.

Optionally, determining the service resource to be occupied includes:
invoking a camera module in the customer client device to obtain graphic code image data of the service resource, and determining the service resource to be occupied by identifying a resource identifier carried in the graphic code image data. Alternatively, the client device can identify an identifier in the service resource through operations such as retrieval and query to determine the service resource to be occupied, where the identifier can be carried in the graphic code image data of the service resource, or stored in the service resource in a code form or in any other suitable form.

Optionally, the method further includes:
providing an order initiating page, and obtaining ordering information from information input by the user on the order initiating page, then initiating, to the server, an ordering request carrying the ordering information.

Optionally, the method further includes:
obtaining and displaying order data sent by the server.

In embodiments of the present specification, resource data of the service resource includes a state identifier for indicating whether the service resource is in a use state or an idle state. Therefore, after an occupying request is received, a state of the service resource can be determined from the state identifier. If the service resource is in the idle state, the resource data is locked, and after the state identifier is updated to the use state, the service resource is unlocked and current occupying data of the service resource is generated. Because the resource data is locked, in a case of concurrent occupying requests, the resource data is obtained and the current occupying data is generated only for one occupying request, while the resource data cannot be obtained for other occupying requests. In addition, after the state identifier is updated to the use state, the resource data is unlocked, and when processing other concurrent occupying requests, the service resource is found to be in the use state, which can prevent the concurrency of multiple occupying requests causing the generation of multiple orders.

Corresponding to the above-mentioned embodiments of the data processing method, the present specification also provides embodiments of data processing apparatus and devices to which the apparatuses are applied.

Figure 5:
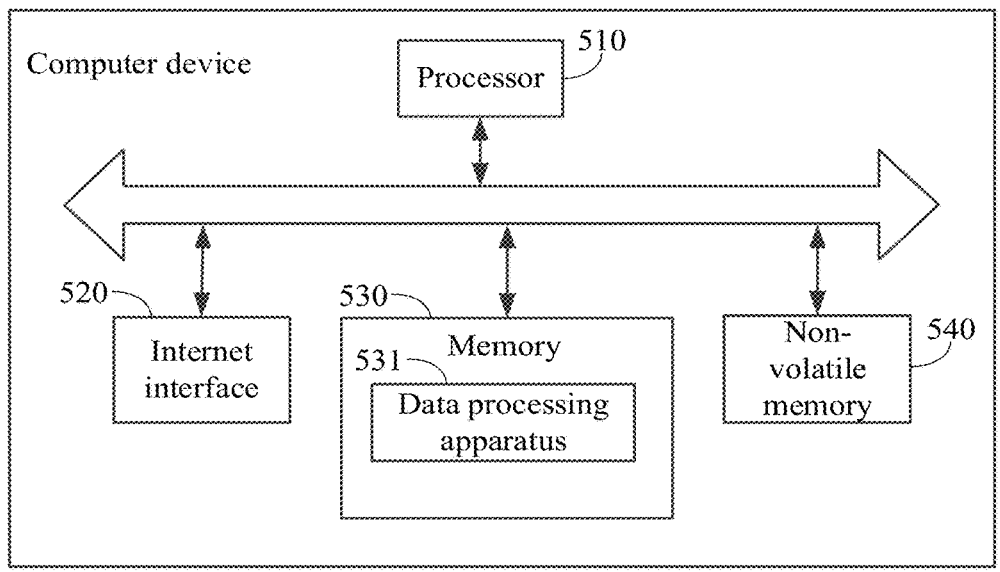
FIG. 5 is a hardware structure diagram illustrating a computer device where a data processing apparatus is located according to an example embodiment of the present specification.

The embodiments of the data processing apparatuses in this specification can be applied to a computer device such as a server or a terminal device. The apparatus embodiments can be implemented by software or hardware or a combination of software and hardware. Taking software implementation as an example, as an apparatus in a logical sense, it is formed by reading the corresponding computer program instructions from one or more non-volatile memories into one or more memories to run through one or more processors in which a file is processed. From a hardware perspective, as shown in FIG. 5, which is a hardware structure diagram of a computer device where a data processing apparatus is located according to the present specification, except for a processor 510, a memory 530, a network interface 520 and a non-volatile memory 540 shown in FIG. 5, the computer device such as a server where an apparatus 531 is located in the embodiment can further include other hardware generally according to the actual function of the computer device, which will not be described in detail.

Figure 6:
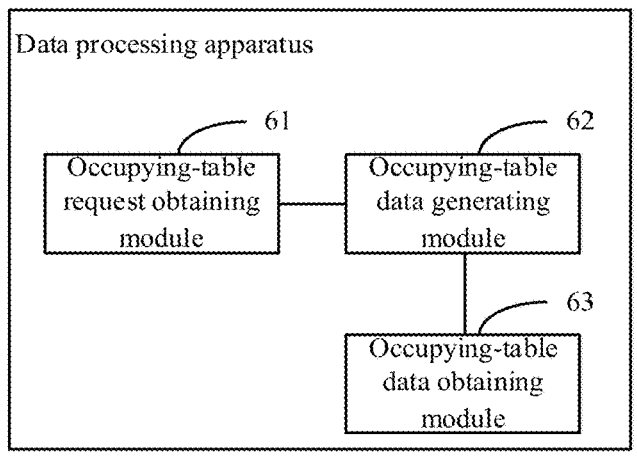
FIG. 6 is a block diagram illustrating a data processing apparatus according to an example embodiment of the present specification.

FIG. 6 is a block diagram illustrating a data processing apparatus according to an example embodiment of the present specification. The apparatus includes:

an occupying-table request obtaining module 61 configured to, after obtaining an occupying-table request for a target table, obtain table data of the target table, where the table data includes a state identifier for indicating whether the target table is in a use state or an idle state;

an occupying-table data generating module 62 configured to, if the state identifier indicates that the target table is in the idle state, lock the table data, after the state identifier is updated to the use state, release the table data, and generate current occupying-table data of the target table to respond to the occupying-table request;

an occupying-table data obtaining module 63 configured to, if the state identifier indicates that the target table is in the use state, obtain the current occupying-table data of the target table to respond to the occupying-table request.

Optionally, the table data is stored in a database, and the occupying-table data generating module 62 is configured to: initiate an exclusive row level lock instruction for the table data to the database to lock the table data.

Optionally, the exclusive row level lock instruction carries update information for the state identifier, so that the table data is to be released after the state identifier is updated to the use state.

Optionally, the occupying-table request is initiated by a customer client device or a merchant client device, and the occupying-table data generating module 62 is configured to: send the current occupying-table data to the customer client device or the merchant client device for the customer client device or the merchant client device to initiate an ordering request based on the current occupying-table data.

Optionally, the apparatus further includes an order data sending module configured to: after the ordering request is received, generate and send local order data to the customer client device and/or the merchant client device.

Optionally, the occupying-table request is initiated by a merchant client device after generating first order data for the target table, and the occupying-table request carries the first order data from the merchant client device.

The occupying-table data generating module 62 and/or the occupying-table data obtaining module 63, when responding to the occupying-table request, are/is configured to:

generate local order data based on the first order data from the merchant client device; associate the current occupying-table data, the first order data from the merchant client device, and the local order data.

Optionally, the apparatus further includes an updating module configured to:

if order data from a customer client device is received, update the first order data from the associated merchant client device and the associated local order data.

The updating module is further configured to: if second order data from the merchant client device is received, update the associated local order data.

Optionally, the updating module is further configured to: after the order is completed, update the state identifier from the use state to the idle state.

Optionally, the order data sending module is further configured to: synchronize the local order data to other client devices that are in a connected state and have initiated an ordering request for the target table.

Figure 7:
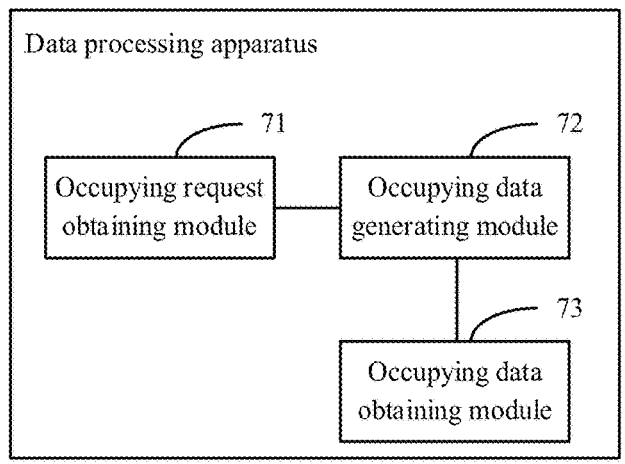
FIG. 7 is a block diagram illustrating a data processing apparatus according to an example embodiment of the present specification.

FIG. 7 is a block diagram illustrating a data processing apparatus according to an example embodiment of the present specification. The apparatus includes:

an occupying request obtaining module 71 configured to, after obtaining an occupying request for a service resource, obtain resource data of the service resource, where the resource data includes a state identifier for indicating whether the service resource is in a use state or an idle state;

an occupying data generating module 72 configured to: if the state identifier indicates that the service resource is in the idle state, lock the resource data, after the state identifier is updated to the use state, release the resource data, and generate current occupying data of the service resource to respond to the occupying request;

an occupying data obtaining module 73 configured to: if the state identifier indicates that the service resource is in the use state, obtain the current occupying data of the service resource to respond to the occupying request.

Optionally, the resource data is stored in a database, and the occupying data generating module 72 is configured to: initiate an exclusive row level lock instruction for the resource data to the database to lock the resource data.

Optionally, the exclusive row level lock instruction carries update information for the state identifier, so that the table data is to be released after the state identifier is updated to the use state.

Optionally, the occupying request is initiated by a customer client device or a merchant client device, and the occupying data generating module 72 is configured to: send the current occupying data to the customer client device or the merchant client device for the customer client device or the merchant client device to initiate an ordering request based on the current occupying data.

Optionally, the apparatus further includes an order data sending module configured to: after the ordering request is received, generate and send local order data to the customer client device and/or the merchant client device.

Optionally, the occupying request is initiated by the merchant client device after generating first order data for the service resource, and the occupying request carries the first order data from the merchant client device.

The occupying data generating module 72 and/or the occupying data obtaining module 73, when responding to the occupying request, are/is configured to:

generate local order data based on the first order data from the merchant client device; associate the current occupying data, the first order data from the merchant client device, and the local order data.

Optionally, the apparatus further includes an updating module configured to:

if order data from the customer client device is received, update the first order data from the associated merchant client device and the associated local order data.

The updating module is further configured to: if second order data from the merchant client device is received, update the associated local order data.

Optionally, the updating module is further configured to: after the order is completed, update the state identifier from the use state to the idle state.

Optionally, the order data sending module is further configured to:

synchronize the local order data to other client devices that are in a connected state and have initiated an ordering request for the service resource.

Correspondingly, this specification further provides a computer device, including: one or more memories, one or more processors and computer programs stored thereon and running on the one or more processors, wherein the one or more processors execute the computer programs to perform the data processing methods as described above.

For the implementation process of functions and roles of each module in the above data processing apparatuses, please refer to the implementation process of corresponding steps in the above data processing methods, which will not be repeated here.

For the apparatus embodiments, since they basically correspond to the method embodiments, reference can be made to the partial description of the method embodiments. The apparatus examples described above are merely illustrative, where the modules described as separate components may or may not be physically separated, and the components displayed as modules may or may not be physical modules, i.e., may be located in one place or may be distributed to multiple network modules. Some or all of the modules can be selected according to actual needs to achieve the objectives of the present specification. Those of ordinary skill in the art can understand and implement the present specification without any creative effort.

The specific embodiments of the present specification are described above. Other embodiments are within the scope of the appended claims. In some cases, actions or steps described in the claims can be performed in a different order from that in the embodiments and can still achieve desired results. In addition, the processes depicted in the drawings do not necessarily require the shown specific order or sequential order to achieve the desired results. In some embodiments, multitasking processing and parallel processing are possible or may be advantageous.

Other embodiments of the present specification will be readily apparent to those skilled in the art after considering the specification and practicing the contents disclosed herein. The present specification is intended to cover any variations, uses, or adaptations of the present specification, which follow the general principle of the present specification and include common knowledge or conventional technical means in the art that are not disclosed in the present specification. The specification and embodiments are to be regarded as illustrative only. The true scope and spirit of the present specification are pointed out by the following claims.

It is to be understood that the present specification is not limited to the precise structures that have described and shown in the drawings, and various modifications and changes can be made without departing from the scope thereof. The scope of the specification is to be limited only by the appended claims.

The above are only the preferred embodiments of the present specification, which are not intended to limit the specification. Any modification, equivalent replacement, improvement, etc. made within the spirit and principle of the specification shall be included within the protection scope of the specification.

The invention claimed is:

1. A data processing method, comprising:
 obtaining, in response to that an occupying-table request for a target table is obtained, table data of the target table in a database stored on a server,
  wherein the table data is stored as a row of data in the database, and
  wherein the table data comprises a state identifier for indicating whether the target table is in a use state or an idle state;
 if the state identifier indicates that the target table is in the idle state,
  locking the table data to prevent others from accessing the table data,
  releasing, in response to that the state identifier is updated to the use state, the table data to allow others access the table data, and
  generating current occupying-table data of the target table to respond to the occupying-table request;
 if the state identifier indicates that the target table is in the use state,
  obtaining the current occupying-table data of the target table to respond to the occupying-table request.

2. The method according to claim 1, wherein the table data is stored in the database, and locking the table data comprises:
 initiating an exclusive row level lock instruction for the table data to the database to lock the table data.

3. The method according to claim 2, wherein the exclusive row level lock instruction carries update information for the state identifier, so that the table data is to be released in response to that the state identifier is updated to the use state.

4. The method according to claim 1, wherein the occupying-table request is initiated by a customer client device or a merchant client device, and responding to the occupying-table request comprises:
 sending the current occupying-table data to the customer client device or the merchant client device for the customer client device or the merchant client device to initiate an ordering request based on the current occupying-table data.

5. A computer device, comprising: one or more memories, one or more processors and a computer program stored on the one or more memories and running on the one or more processors, wherein the one or more processors execute the computer program to perform:

obtaining, in response to that an occupying request for a service resource is obtained, resource data of the service resource in a database stored on a server, wherein the resource data is stored as a row of data in the database, and wherein the resource data comprises a state identifier for indicating whether the service resource is in a use state or an idle state;

if the state identifier indicates that the service resource is in the idle state, locking the resource data to prevent others from accessing the resource data, releasing, in response to that the state identifier is updated to the use state, the resource data to allow others access the resource data, and generating current occupying data of the service resource;

if the state identifier indicates that the service resource is in the use state, obtaining the current occupying data of the service resource to respond to the occupying request.

6. The method according to claim 1, wherein the occupying-table request is initiated by a merchant client device in response to that order data for the target table is generated, and the occupying-table request carries the order data from the merchant client device.

7. A data processing method, comprising:

obtaining, in response to that an occupying request for a service resource is obtained, resource data of the service resource in a database stored on a server, wherein the resource data is stored as a row of data in the database, and wherein the resource data comprises a state identifier for indicating whether the service resource is in a use state or an idle state;

if the state identifier indicates that the service resource is in the idle state, locking the resource data to prevent others from accessing the resource data, releasing, in response to that the state identifier is updated to the use state, the resource data to allow others access the resource data, and generating current occupying data of the service resource;

if the state identifier indicates that the service resource is in the use state, obtaining the current occupying data of the service resource to respond to the occupying request.

8. The method according to claim 7, wherein the resource data is stored in athe database, and locking the resource data comprises:

initiating an exclusive row level lock instruction for the resource data to the database to lock the resource data.

9. The method according to claim 8, wherein the exclusive row level lock instruction carries update information for the state identifier, so that the resource data is to be released in response to that the state identifier is updated to the use state.

10. The method according to claim 7, wherein the occupying request is initiated by a customer client device or a merchant client device, and responding to the occupying request comprises:

sending the current occupying data to the customer client device or the merchant client device for the customer client device or the merchant client device to initiate an ordering request based on the current occupying data.

11. The method according to claim 10, further comprising:

generating and sending, in response to that the ordering request is received, local order data to the customer client device or the merchant client device.

12. The method according to claim 11, further comprising:

synchronizing the local order data to other client devices that are in a connected state and have initiated an occupying request for the service resource.

13. The method according to claim 7, wherein the occupying request is initiated by a merchant client device in response to that first order data for the service resource is generated, and the occupying request carries the first order data from the merchant client device.

14. The method according to claim 13, wherein responding to the occupying request comprising:

generating local order data based on the first order data from the merchant client device;

associating the current occupying data, the first order data from the merchant client device, and the local order data.

15. The method according to claim 14, further comprising:

updating, in response to that order data from a customer client device is received, the first order data from the associated merchant client device and the associated local order data.

16. The method according to claim 14, further comprising:

updating, in response to that second order data from the merchant client device is received, updating the associated local order data.

17. The method according to claim 7, further comprising:

updating, in response to that the order is completed, the state identifier from the use state to the idle state.

\* \* \* \* \*